Jan. 26, 1960 K. F. ROSS 2,923,005
RADIO LOCATION AND WARNING SYSTEM
Filed Sept. 28, 1956 2 Sheets-Sheet 1
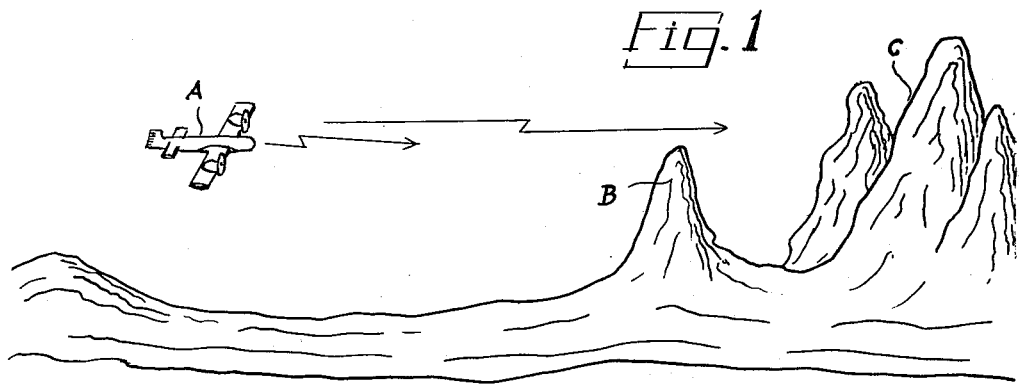
Fig.1
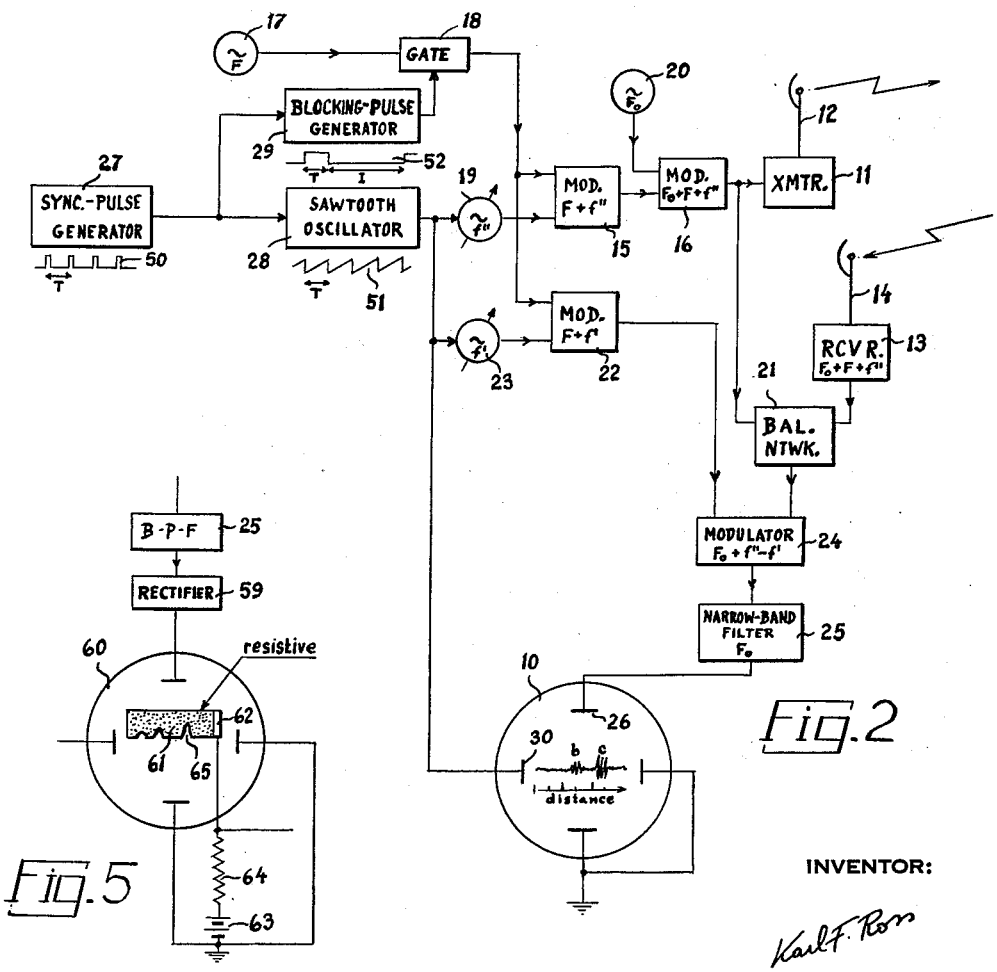
INVENTOR:
Karl F. Ross INVENTOR:
Karl F. Ross

United States Patent Office 2,923,005
Patented Jan. 26, 1960

2,923,005

RADIO LOCATION AND WARNING SYSTEM

Karl F. Ross, New York, N.Y.

Application September 28, 1956, Serial No. 612,865

14 Claims. (Cl. 343—14)

My present invention relates to a system for detecting the existence of moving or stationary objects and measuring their distance from an observer by means of reflected high-frequency waves.

In my co-pending application Ser. No. 186,694, filed September 26, 1950, now Patent No. 2,774,065, issued December 11, 1956, I have disclosed a radar-type detection system adapted to be trained upon a particular object at a given distance from the observer for the purpose of ascertaining its radial and/or peripheral speed. A feature of that system resides in its ability to give information relative to the location of such object irrespectively of the presence of other reflecting objects nearer to the observer.

My instant invention concerns a further development of that system adapted to detect the presence of any number of reflecting objects and to indicate their respective distances from the observer. The invention aims more particularly at providing means for locating such objects even if their spacing from the observation post is so close as to prevent their detection by conventional echo-pulse methods, this being the case where the back-and-forth travel time of the transmitted pulse is not substantially greater than its necessary duration. Another object of this invention is to provide means for detecting, especially as an aid to aerial navigation, the presence of nearby mountain peaks or similar obstacles whose existence may be masked, as far as discovery by known beat-frequency systems is concerned, by predominant reflections from a more remote mountain range or the like.

In the beat-frequency systems just referred to, which have been described for example in Newhouse Patents Nos. 2,247,662 and 2,261,272, a progressively frequency-modulated wave is fed to a transmitter and also to a mixing circuit which in addition is supplied by an associated receiver with reflected energy from the transmitted wave. The resulting beat note is of a frequency proportional to the distance of the transmitter-receiver station from a reflecting surface. If, as disclosed in my above-identified prior patent, the modulation pattern of the directly supplied component is phase-shifted so as to lag behind the pattern of the transmitted wave, and if a fixed-frequency component $F_0$ is superimposed upon this directly supplied component, then a narrow-band-pass filter centered on $F_0$ will sift from the output of the mixing circuit only such wave energy as is due to reflection from an object located at a particular distance determined by the time lag between the two modulation patterns. Through suitable adjustment of this time lag it is then possible to probe for the existence of reflecting objects along a perimeter of desired radius.

In accordance with the present invention I provide a progressively increasing phase displacement between the two modulation patterns by making the rate of frequency change of the directly supplied component different from that of the outgoing wave, whereby the occurrence of a pulse in the output of the band-pass filter will indicate the existence of a reflecting surface at a distance from the transmitting station determinable from the time of occurrence. Advantageously, the modulation patterns are of sawtooth shape and the leading edge of the pattern of the directly supplied component is made less steep than that of the outgoing component; then, with the frequency difference between the two components at the beginning of a sawtooth cycle arranged to equal the filter frequency $F_0$, the time of the pulse within the cycle will be proportional to the distance of the reflecting object.

The ability of this system to locate objects at close as well as remote distances enables it to be used in connection with a display indicator of the generaly type disclosed in my co-pending application Ser. No. 472,793, filed December 3, 1954. This type of indicator responds to distance indications from two geographically separated stations to show the location of a reflecting object as the intersection of two conic sections, such as two circles or one circle and one ellipse, representing great sections of respective spheroids on whose surfaces the object is to be found. Whereas the teachings of that application enable the detection of only a single object and in the presence of a group of such objects provide an indication of the location of only the geometrical center of such group, it is now possible with the aid of the instant system to obtain a visual display of the approximate positions of several simultaneously present reflecting bodies. A feature of this aspect of my invention involves the plotting of three conic sections on the screen of a cathode ray tube and the indication of an object's location as a point of triple coincidence.

The invention will be described in greater detail with reference to the accompanying drawing in which:

Fig. 1 illustrates fanciful scenery in the path of an aircraft equipped with navigational apparatus including a system according to the invention;

Fig. 2 is a circuit diagram of the radio location system assumed to be installed aboard the aircraft of Fig. 1;

Figure 4:
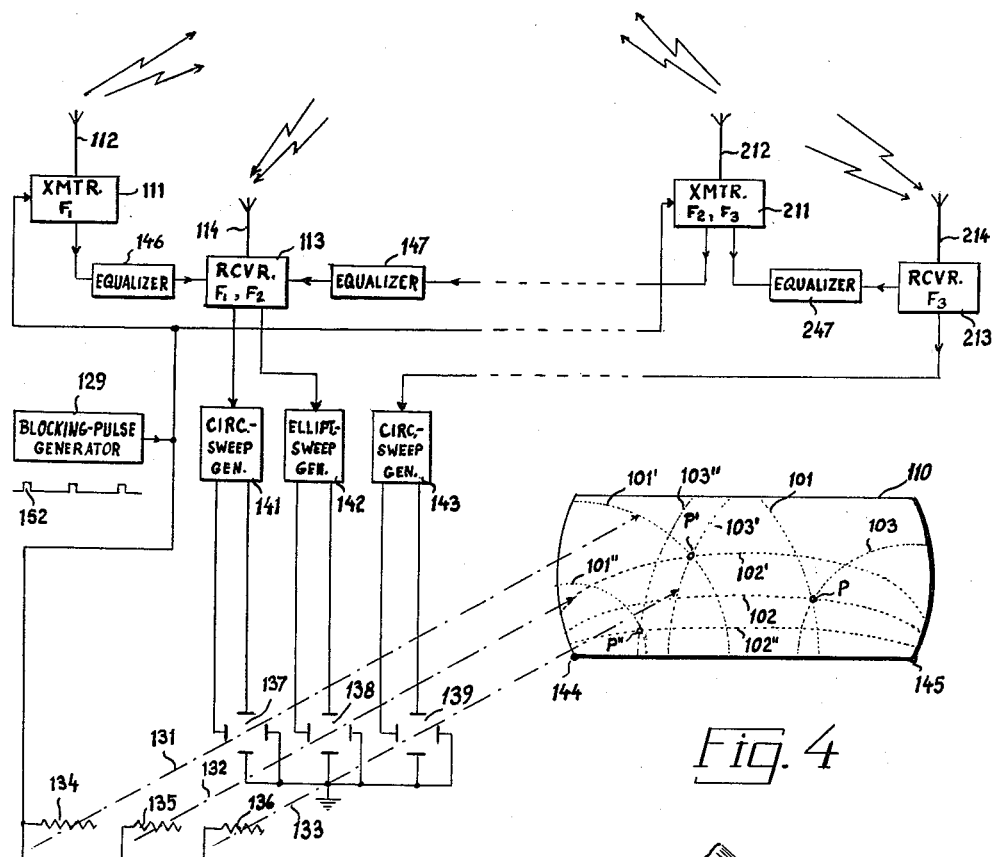

Fig. 4 schematically shows a display indicator apparatus operating on the principles described in connection with Figs. 2 and 3;

Fig. 5 shows an element of the apparatus of Fig. 4; and

Figure 6:
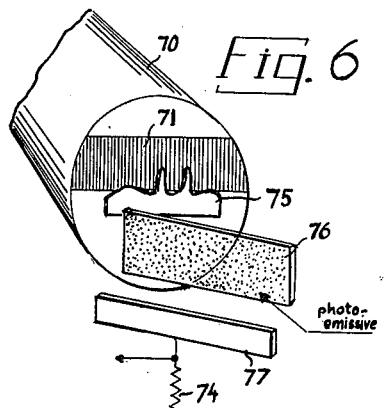

Fig. 6 perspectively illustrates a modification of the element of Fig. 5.

In Fig. 1 I have shown an aircraft A provided with a radio location system according to the invention whereby high-frequency waves are emitted in the direction of flight to apprise the pilot of the shape of the terrain ahead. This terrain is seen to include a sharp peak B in front of an extended mountain range C. Clearly, adequate safety against collision with peak B will be provided only by a system capable of distinguishing this peak from the range C and of indicating its correct distance from the craft A.

A system adapted to satisfy these requirements is shown in Fig. 2 as comprising primarily a visual indicator 10 constituted by the screen of a cathode-ray tube, a transmitter 11 with directive antenna 12 and a receiver 13 with directive antenna 14. Transmitter 11 is energized from two modulators 15, 16 connected in cascade. Modulator 15 receives a carrier frequency F from a source 17, via a gate 18, and a variable oscillation $f''$ from a generator 19. This modulator produces a beat frequency $F+f''$, selected by a suitable filter not separately illustrated, which it feeds to modulator 16; the latter also receives from a source 20 a fixed-frequency component $F_0$ which it combines with the output of modulator 15 to produce a frequency $F_0+F+f''$ representing the outgoing wave transmitted by antenna 12. The output of modulator 16, suitably adjusted in phase and magnitude by means not shown, is also applied to the input of a balancing network 21 whose other input is energized by receiver 13, this network serving to suppress in the receiver output all wave energy directly transmitted from antenna 12 to antenna 14.

The carrier frequency F from gate 18 is also supplied to a modulator 22 along with a variable oscillation $f'$ from a generator 23. The output of modulator 22, of frequency $F+f'$ and the output of balancing network 21, representing the reflected portion of outgoing wave $F_0+F+f''$, are both applied to a modulator 24 which selects the lower one of the two sidebands produced, i.e., a frequency $F_0+f''-f'$. This frequency is fed to a narrow-band-pass filter 25 tuned to frequency $F_0$ so as to produce an output only when the value of $f''$ in the frequency combination received by antenna 14 equals the instantaneous value of $f'$, such output being impressed upon vertical deflecting electrode 26 of cathode-ray tube 10.

A synchronizing-pulse generator 27 controls a sawtooth oscillator 28 and a blocking-pulse generator 29. The latter applies to gate 18 a succession of unblocking pulses each equal in duration to a cycle T of generator 27 and oscillator 28, separated by blocking intervals 52 whose duration I equals a plurality of such cycles. The output 51 of sawtooth oscillator 28 controls the variable oscillators 19 and 23 and is also impressed upon horizontal deflecting electrode 30 of tube 10. The screen of this tube is calibrated in the horizontal dimension in suitable units of distance, such as meters or feet.

Figure 3:
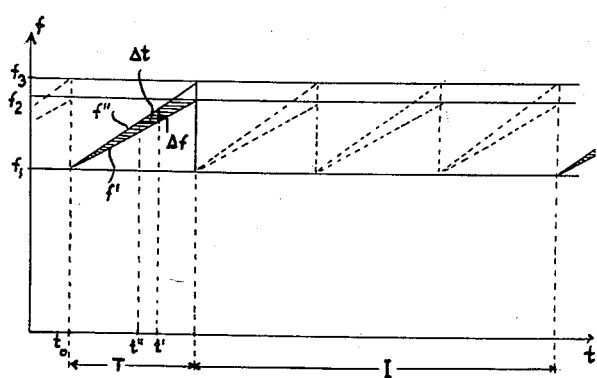
Fig. 3 is a graph illustrating the frequency modulation patterns produced by the system of Fig. 2.

Reference is now made to Fig. 3 where the frequency modulation pattern of oscillations $f'$ and $f''$ has been illustrated. Frequency $f'$ varies from a lower value $f_1$ linearly to an upper value $f_2$, returning to $f_1$ practically instantaneously after an interval T corresponding to the recurrence period of the synchronizing pulses 50 from generator 27. Frequency $f''$ varies similarly from lower value $f_1$ to an upper value $f_3$ higher than $f_2$, returning virtually instantaneously to $f_1$ at the end of interval T. As the sawtooth patterns of $f'$ and $f''$ both have positive slopes, modulator 24 combines these two frequencies differentially in order to bring about a relative inversion of those patterns whereby the variable components $f'-f_1$, $f''-f_1$ will cancel at one point of a cycle T; if the slope of, say, frequency $f'$ had been negative, they would have been additively combined by the circuit 24.

Let us assume that the value of $f'$ at a particular time $t'$ equals the value of the component $f''$ in the reflected wave then received by antenna 14, this being the value of $f''$ in the outgoing wave at an earlier time $t''$ where $t'-t''=\Delta t$ is the length of time required for the transmitted wave energy to reach the reflecting object and to return to the station 11, 13 aboard the craft A. From the shaded triangle in Fig. 3 it will be apparent that $\Delta t$ is proportional to $\Delta f$, the difference between $f''$ and $f'$ as they appear at time $t'$ in the outputs of oscillators 19 and 23, respectively, and that this latter difference in turn is proportional to the time interval $t'-t_0$ where $t_0$ is the reference time at the beginning of a sawtooth cycle. Since this time interval is also measured by the magnitude of the voltage output 51 of sawtooth oscillator 28 which provides the deflecting potential (here negative) for electrode 30, the horizontal displacement of the luminous spot on indicator screen 10 will be proportional to the distance of the reflecting object whose presence is indicated by a sudden pulsing of the electron beam caused by the appearance of a vertical deflecting voltage on electrode 26. Thus, pulses $b$ and $c$ represent the terrain formations B and C, respectively, of Fig. 1, the greater amplitude of pulse $c$ being due to the more intense reflection of the waves by the relatively extensive mountain range C. It will be understood that the vertical beam deflection could also be replaced by a change in brightness at the locations $b$ and $c$.

If reflecting objects are positioned at such distance that the travel time of the transmitted and received wave energy is of the order of one or more cycles T, thus at a distance greatly exceeding the range for which the indicator 10 has been calibrated, their echoes may occur at a time liable to cause a false indication to appear on the indicator screen. For this reason it is desirable to make the system only intermittently operative, as by the iterative blocking of gate 18 by means of negative pulses 52 from generator 29, so that no transmission takes place for an interval I long enough to prevent such spurious signals from effectively influencing the operation of the system. By way of example the interval I has been shown to extend over three cycles T which have, accordingly, been indicated in dotted lines in the graph of Fig. 3.

In Fig. 4 I have illustrated a monitoring system for the detection of intruding objects, such as low-flying aircraft, by means of a display indicator 110 forming part of one of two transmitting and receiving stations positioned remote from each other. The first station comprises, in addition to indicator 110, a transmitter 111 with antenna 112 and a receiver 113 with antenna 114, having associated with them various oscillator and modulator circuits (not shown) as described in connection with Fig. 2 in order to produce frequency-modulated waves varying according to a sawtooth pattern. Transmitter 111 emits a wave with a carrier component $F_1$ (in addition to components $F_0$ and $f''$) while receiver 113 is adapted to detect this same wave as well as a similar wave having a carrier component $F_2$. Indicator 110 again is constituted by the screen of a cathode-ray tube, this tube including means (not shown) for producing three electron beams 131, 132, 133 whose intensity is controlled by three grids 134, 135, 136 and which are subject to deflection by associated electrode sets 137, 138, 139, respectively. Grids 134, 135, 136 are connected in parallel to the output of a blocking-pulse generator 140. Unlike the antennas of Fig. 2, antennas 112, 114 are preferably omnidirectional or broadly directive, at least in a vertical plane, so as to encompass an angle of not less than about 90°.

Three sweep generators 141, 142, 143 control the deflecting electrodes 137, 138, 139, respectively. Sweep generators 141 and 143 are of the usual circular type applying sinusoidal scanning voltages with a 90° phase difference to the horizontal and the vertical deflecting electrodes associated therewith. Sweep generator 142 is of the elliptical type disclosed, for example, in Budenbom Patent No. 2,515,332 and produces horizontal and vertical deflecting voltages whose amplitudes are related as the major and minor axes of an ellipse with predetermined interfocal spacing. Lower left-hand corner 144 of screen 110 represents the center of the circular traces described by beam 131, three of which are shown at 101, 101', 101'', and also the left-hand focus of the elliptical traces described by beam 132, three of which have been illustrated at 102, 102', 102''. Lower right-hand corner 145 of screen 110 similarly represents the right-hand focus of the aforementioned elliptical traces and also the center of the circular traces described by beam 133, three of the latter having been shown at 103, 103', 103''.

The second station comprises a transmitter 211 with antenna 212 and a receiver 213 with antenna 214. Transmitter 211 emits two separate waves whose carrier components are $F_2$ and $F_3$, receiver 213 being adapted to detect only the latter. A connection extends from transmitter 111 to receiver 113 by way of an equalizer 146; similar connections lead from transmitter 211 to receiver 113 via an equalizer 147 and to receiver 213 through an equalizer 247. The purpose of these connections is to compensate for wave energy received by direct transmission from the corresponding transmitters, such compensation being effected by means of balancing circuits similar to the one shown at 21 in Fig. 2. The inclusion of the equalizers is desirable since the intensity of direct transmission may vary with frequency, these equalizers also serving to insure proper phasing of the compensating oscillations. Equalizers having a desired amplitude and phase response over a predetermined frequency band are well known and need not be particularly described. The various connections extending between the two stations, shown partly in dotted lines, are representative of any substantially reflection-independent links, such as wires or low-frequency radio channels.

Sweep circuits 141 and 142 are both controlled from receiver 113, the former by the demodulated wave energy from carrier $F_1$ and the latter by that from carrier $F_2$. In similar manner the sweep circuit 143 is controlled by receiver 213 in response to the demodulated wave energy from carrier $F_3$. Thus, the radii of the circular traces described by beams 131, 133 and the axes of the elliptical traces of beam 132 will be determined by the magnitudes of the three outputs produced by the two receivers 113, 213. It will be understood that common sources of carrier frequencies $F_1$, $F_2$ and $F_3$ may serve the transmitters and receivers associated with these frequencies.

For the proper control of sweep circuits 141, 142, 143 the receivers 113 and 213 must include means for replacing the horizontal displacement of an output pulse, which in Fig. 2 is proportional to the elapsed portion of modulation period T, by a progressively increasing pulse potential. A suitable circuit for this purpose is shown in Fig. 5 where the output of filter 25 is first rectified in a network 59 before being applied to the vertical deflecting electrodes of a cathode-ray tube 60 whose horizontal beam deflection is again controlled by the sawtooth oscillator 28 (not shown in Fig. 5). Instead of a calibrated, luminous screen the cathode-ray tube 60 comprises a target 61 of resistance material having a conductive electrode 62 attached to its right-hand extremity, this electrode in turn being connected to the positive terminal of a battery 63 by way of a resistor 64. Target 61 is positioned slightly above the horizontal central plane of the tube representing the locus of displacement of the beam in the absence of a deflecting potential from rectifier 59; when, however, a pulse is passed by filter 25, the upper vertical electrode is driven positive and the beam impinges upon target 61 so as to produce, at the upper terminal of resistor 64, a negative pulse whose magnitude can be made to vary substantially proportionally with the horizontal displacement of the beam while being independent of the extent of its upward deflection.

With this arrangement the amplitude of a voltage pulse on the left-hand output lead of receiver 113 will be porportional to the radius of a sphere, centered on station 111, 113, on which a reflecting object is located; the amplitude of a pulse in the output of receiver 213 will be proportional to the radius of a similar sphere centered on station 211, 213; and the amplitude of a pulse appearing on the right-hand output lead of receiver 113 will vary linearly with the major axis of an ellipsoid on whose surface the object is to be found and whose foci are represented by the two stations. Stated more generally, the receivers will apply to the sweep circuits 141, 142, 143 three different signals indicating the lengths of three separate transmission paths over which radiated wave energy is received after reflection by an extraneous object, these signals indicating the parameters of three intersecting spheroids defining the position of the reflecting object.

Because re-radiation of the emitted high-frequency wave energy by stationary surrounding objects (background reflection) may cause the application of undesired input pulses to the sweep generators, means are preferably provided for rendering the target 61 insensitive to beam deflections caused by a predetermined pattern of incoming waves. This is accomplished in Fig. 5 by forming the target 61 with a jagged lower edge whose notches 65 correspond to the locations and amplitudes of the undesired pulses. If at any such location additional wave energy is received from an intruding object, the upward deflection of the beam will be increased so that the electrons will strike the target and give rise to an output controlling the corresponding sweep generator.

A modified form of translator with similar effect has been illustrated in Fig. 6 where the cathode-ray tube 70 is formed with a luminescent strip 71 located slightly above the horizontal median plane of the tube, thus in generally the same area as the target 61 of Fig. 5. A masking tape 75 is pasted externally on the tube envelope so that portions of it cover the luminescent strip 71 at the locations corresponding to the undesired pulses. When the beam strikes the strip 71, the resulting luminous spot excites a photo-emissive cathode 76 which thereupon emits electrons toward a plate 77 connected through resistor 74 to positive potential. The cathode 76 is positioned at an angle to the face of the tube so that the intensity of the impinging light is progressively increased as the beam moves from right to left under the control of the deflecting voltage from sawtooth oscillator 28 (Fig. 2). It will thus be apparent that the output obtained across resistor 74 is similar in character to that derived from resistor 64 in Fig. 5.

The arrangement of Fig. 6 has the additional advantage that the masking tape 75 may readily be changed whenever the surroundings of the corresponding receiving station and therefore the character of the background reflection are significantly altered.

Let us assume that three objects are within range of the apparatus, their locations being indicated on the screen 110 at P, P' and P". (As has been explained in my co-pending application Ser. No. 472,793, the apparent elevation of these objects on the screen exceeds their actual height above the ground unless they happen to be in a vertical plane passing through the line which connects the two stations 111, 113 and 211, 213.) Normally, i.e. when zero control voltages are applied to sweep generators 141, 142 and 143, the beams 131, 132, 133 will impinge upon the lower edge of screen 110 so as not to give any visible picture (if desired, they may of course be biased to fall completely outside the screen); in the presence of the three reflecting objects, however, a finite control voltage will be impressed upon each sweep generator at three successive times within a cycle T so that, if the sweep frequencies of these generators are high compared with the modulation frequency 1/T, each beam will produce the three distinct traces shown in the drawing. Point P will then be found at the intersection of traces 101, 102, 103, points P' and P" being similarly determined by three-way intersection of traces 101', 102', 103' and 101", 102", 103", respectively.

It will be noted that simple intersections between two traces occur at various points not representing the location of any object, hence it will be desirable to utilize the teachings of my aforesaid application Ser. No. 472,793 according to which the intensity of each beam alone is insufficient to excite the screen to visible luminosity and only the simultaneous or immediately consecutive excitation of any area of the screen by several beams gives rise to a clearly discernible spot. Whereas, however, I have applied this principle in my earlier application to a system of two beams only, I now propose to make the intensities of the three beams 131, 132, 133 such that only triple coincidence will produce a visible mark on the screen 110. Blocking-pulse generator 129 produces short positive pulses 152 which allow the electron beams to exist only for relatively brief periods preferably corresponding to the length of a modulation cycle T, the cadence of these blocking pulses 152 (corresponding to pulses 52 in Fig. 2) being advantageously not less than about twenty cycles per second so as to aid in the visual persistence of the images produced on the screen. As a result, luminous spots will appear only at the triple-coincidence points P, P' and P". Naturally, in some instances such triple coincidence may also accidentally occur at spurious locations, but they will generally exist for short periods only and will again disappear as the moving objects change their relative positions.

The output pulses 152 of generator 129 are also shown applied to transmitters 111 and 211 for the purpose of synchronizing their operations with that of the display indicator 110, as by triggering the sawtooth oscillators 28 and controlling the gates 18 (Fig. 2) of these transmitters. It will be appreciated that in this case the blocking interval I also provides the necessary decay time for the luminous persistence of screen 110 so as to prevent spurious excitation on a subsequent cycle, this persistence being sufficient to produce a visible spot in response to three intersecting traces occurring at any time within a single cycle T.

The invention is, of course, not limited to the specific embodiments described and illustrated but may be embodied in various modifications and adaptations thereof as will be apparent to persons skilled in the art. By way of example it may be mentioned that the addition of a separate frequency component $F_0$, as shown in Fig. 2, is not necessary but that the outgoing wave radiated by antenna 12 and the directly transmitted component produced by modulator 22 may be more generally of frequencies $F''+f''$ (or $F''-f''$) and $F'+f'$ (or $F'-f'$), respectively, where the difference (or the sum, if $f'$ and $f''$ vary inversely) of $F''$ and $F'$ equals F; in an extreme case $F'$ could be zero. Also, simultaneous use may be made of both sidebands $F''\pm f''$ and $F'\pm f'$ for the purpose of determining the radial speed of a detected object in accordance with the teachings of my aforementioned Patent No. 2,774,065.

I claim:

1. A radio location system comprising first generator means for producing a first high-frequency wave representing a sideband resulting from the modulation of a fixed-frequency carrier $F''$ with an oscillation $f''$ varying substantially linearly according to a sawtooth pattern of period T, second generator means for producing a second wave representing a sideband resulting from the modulation of a fixed-frequency component $F'$ with an oscillation $f'$ varying substantially linearly according to a sawtooth pattern of substantially the same period T but at a lesser rate than said oscillation $f''$, transmitter means connected to said first generator means for radiating said first wave, receiver means adapted to detect reflections of said first wave from extraneous objects, modulator means connected to said receiver means and to said second generator means for so mixing the outputs thereof as to combine the frequency components $f''$, $f'$ in said outputs with relative inversion of their sawtooth patterns, narrow-band-pass filter means connected to said modulator means and adapted to produce an output upon mutual cancellation of the variable portions of said frequency components $f''$, $f'$, and indicator means controlled by said filter means for signaling the occurrence of such mutual cancellation in relation to the elapsed portion of said period T upon said occurrence.

2. A system according to claim 1, wherein said indicator means comprises means for deflecting an electron beam in the rhythm of said sawtooth patterns and means for distinctively pulsing said electron beam in response to the output of said filter means.

3. A system according to claim 1, wherein said indicator means comprises pulse-producing means responsive to the output of said filter means and means for progressively varying the magnitude of the output of said pulse-producing means in the rhythm of said sawtooth patterns.

4. A system according to claim 1, further comprising blocking means for inactivating said transmitter means for an interval equaling at least one period T following an operating interval substantially equal to said period T.

5. A radio location system comprising transmitter means for radiating high-frequency wave energy, receiver means for detecting portions of said wave energy reflected by an extraneous object over three different transmission paths, signal means controlled by said receiver means for producing three electrical variables of a magnitude determined by the lengths of said transmission paths whereby the parameters of three intersecting spheroids may be plotted on whose surfaces said object is located, and visual indicator means controlled by said signal means, said indicator means comprising a cathode-ray tube having a luminescent screen, tracing means including a source of three electron beams in said tube for describing three conic sections respectively related to said spheroids on said screen, control means for said tracing means responsive to said electrical variables for so modifying the parameters of said conic sections as to indicate the location of said object at a point of intersection of all three of said conic sections, and intensity-controlling means for providing alternate "on" and "off" periods for said beams, the intensity of said beams during said "on" periods being insufficient to excite said screen to visible luminosity except upon coincidence of all of said beams upon the same screen area, said screen having a sufficient luminous persistence to be excitable to visible luminosity by successive impingement of said beams upon said screen area within any one of said "on" periods, said "off" periods being long enough to enable the residual luminosity of said screen to decay to insignificant values.

6. A system according to claim 5, wherein the cadence of said "on" periods is of the order of at least twenty cycles per second.

7. A system according to claim 5, wherein said control means comprises sweep means adapted to deflect said beams over curvilinear paths in repeated sweeps during each "on" period.

8. A radio location system comprising first source means for producing three high-frequency waves each with a fixed-frequency carrier component and a variable-frequency component varying substantially linearly according to a sawtooth pattern of predetermined cycle length, transmitter means for radiating said high-frequency waves, receiver means for detecting portions of said waves reflected by an extraneous object over three different paths, second source means for producing three additional waves each with a variable-frequency component varying substantially linearly according to a sawtooth pattern of substantially the same cycle length but at a lesser rate than a corresponding variable-frequency component of said high-frequency waves, modulator means connected to said receiver means and to said second source means for mixing energy from each reflected wave with energy from a respective additional wave in such sense as to combine said variable-frequency components thereof with relative inversion of their sawtooth patterns, narrow-band-pass filter means connected to said modulator means and adapted to produce three separate outputs each representing energy from a respective reflected wave upon cancellation of its variable-frequency component with the corresponding component of the additional wave mixed therewith, translator means for converting said three outputs into three electrical pulses of a magnitude varying substantially linearly with the time of occurrence of said cancellation within a cycle of said sawtooth patterns, a cathode-ray tube having a luminescent screen and a source of three electron beams, and separate sweep means for said beams each controlled by said translator means and adapted to deflect the associated beam into a curvilinear path forming part of a conic section with a variable parameter determinable by the magnitude of a respective one of said pulses, whereby the location of a reflecting object is indicated on said screen by the triple intersection of said three curvilinear paths.

9. A system according to claim 8, further comprising blocking means for periodically inactivating said transmitter means and simultaneously suppressing said beams.

10. A system according to claim 9, wherein said blocking means is adapted to maintain said transmitter means operative and said beams in existence for a period substantially corresponding to a cycle of said sawtooth patterns.

11. A system according to claim 10, wherein each of said sweep means has an operating cycle representing a small fraction of a cycle of said sawtooth patterns.

12. A system according to claim 11, wherein said beams have an intensity insufficient to excite said screen to visible luminosity except upon coincidence of all of said beams upon the same screen area, said screen having a sufficient luminous persistence to be excitable to visible luminosity by successive impingement of said beams upon said screen area within an interval corresponding to a cycle of said sawtooth patterns, and wherein said blocking means is adapted to inactivate said transmitter and to suppress said beams for a time long enough to enable the residual luminosity of said screen to decay to an insignificant value.

13. A system according to claim 8, wherein said transmitter and receiver means include means for emitting a first high-frequency wave and receiving reflections thereof substantially at the point of its emission, means for emitting a second high-frequency wave and receiving reflections thereof at a location remote from the point of its emission, and means for emitting a third high-frequency wave and receiving reflections thereof substantially at the point of its emission.

14. A system according to claim 13, wherein said transmitter means includes a first station having means for emitting said first wave and receiving said first and second waves as well as a second station having means for emitting said second and third waves and receiving said third wave.

References Cited in the file of this patent
UNITED STATES PATENTS

| | | |
|---|---|---|
| 2,050,418 | Boerner | Aug. 11, 1936 |
| 2,422,100 | Huff | June 10, 1947 |
| 2,637,028 | McIlwain | Apr. 28, 1953 |
| 2,695,995 | Cauchois | Nov. 30, 1954 |
| 2,754,510 | Cauchois | July 10, 1956 |